United States Patent [19]
Jorgensen et al.

[11] Patent Number: 6,152,009
[45] Date of Patent: Nov. 28, 2000

[54] ARCHITECTURAL MILLWORK JIG

[76] Inventors: Daniel D. Jorgensen, 7733 Cayenne Plz. West, Woodbury, Minn. 55125; Thomas J. Simonson, 2215 E. Fifth St., St. Paul, Minn. 55119

[21] Appl. No.: 09/134,062

[22] Filed: Aug. 13, 1998

[51] Int. Cl.[7] .................. B26B 7/02; B26B 3/02; B27B 19/00; B25B 5/12
[52] U.S. Cl. .................. 83/761; 83/766; 83/767; 83/762; 83/454; 144/216; 144/287; 269/79; 269/228; 269/295
[58] Field of Search .................. 83/761, 766, 767, 83/468.3, 468.4, 471.3, 477.2, 452, 454; 269/79, 228, 295; 144/216, 217, 287

[56] References Cited

U.S. PATENT DOCUMENTS

| | | | |
|---|---|---|---|
| 3,763,733 | 10/1973 | Jambor | 83/766 |
| 4,281,827 | 8/1981 | Horwath | 83/766 X |
| 4,452,117 | 6/1984 | Brickner et al. | 83/468.3 X |
| 4,743,004 | 5/1988 | Kloss . | |
| 4,890,657 | 1/1990 | Shelhorse | 83/471.3 X |
| 5,042,346 | 8/1991 | McCann . | |
| 5,094,279 | 3/1992 | Dickey et al. . | |
| 5,161,589 | 11/1992 | DeBiagio . | |
| 5,427,006 | 6/1995 | Finley | 83/477.2 X |
| 5,473,968 | 12/1995 | Break et al. | 83/471.3 |
| 5,564,323 | 10/1996 | Sasaki et al. | 83/471.3 |

OTHER PUBLICATIONS

Cook, G., "Coping Table," Tricks of the Trades: Building Methods and Materials, Taunton Press, Inc., Trim and Siding chapter, p. 115, (1994).

*Primary Examiner*—Rinaldi I. Rada
*Assistant Examiner*—Boyer Ashley

[57] ABSTRACT

An architectural millwork jig for the cutting of at least one cope in a strip of architectural millwork such as crown molding. The jig includes a base for stabilizing the millwork and further includes a table with a through opening positionable over the end face to be cut. A powered jig saw rides on the table about the opening, where the powered jig saw includes a foot for riding on the table and a blade reciprocating between two toes of the foot, and where the blade makes the cut in the end face of the millwork. The table is swingable about at least the x and y axes so as to provide a proper alignment for the surface of the table on which the foot of the powered jig saw rides. Swinging of the table about one axis permits one jig to be used for right hand and left hand copes and further permits the table to be adjusted to the exact angle of the right hand cope or to the exact angle of the left hand cope. Swinging about this one axis further permits the table to be swung into position to cope flat miters. Swinging of the table about another axis permits the table to be aligned relative to the slope of the bevel. A method of cutting into the end piece of the millwork is also disclosed.

21 Claims, 7 Drawing Sheets

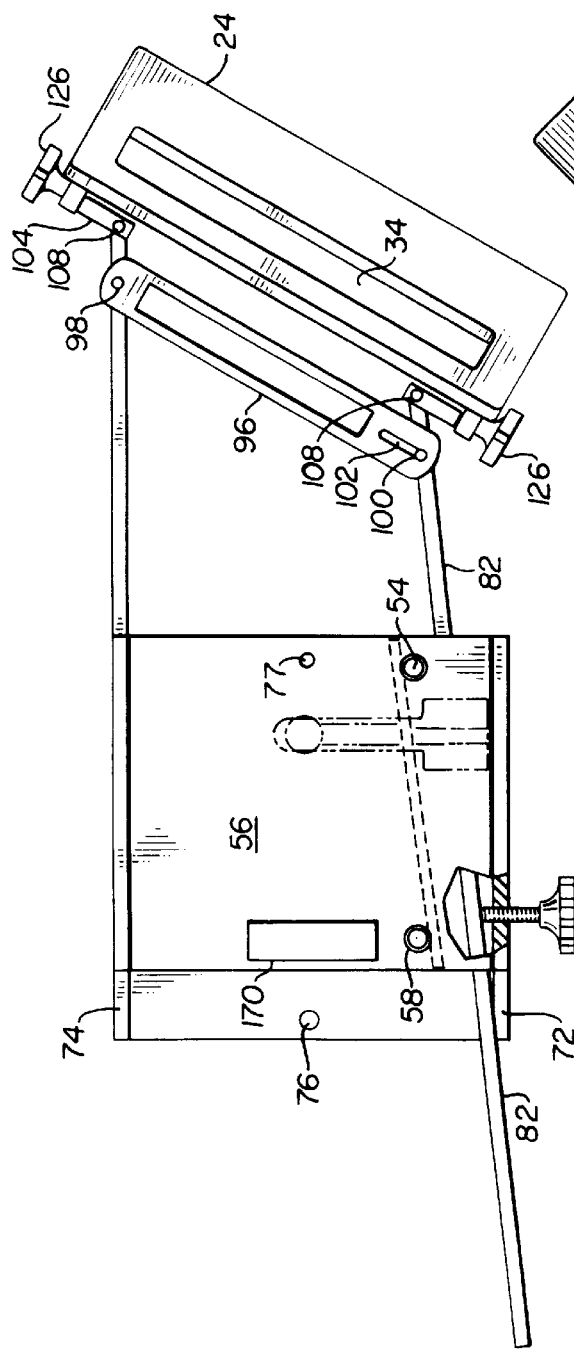
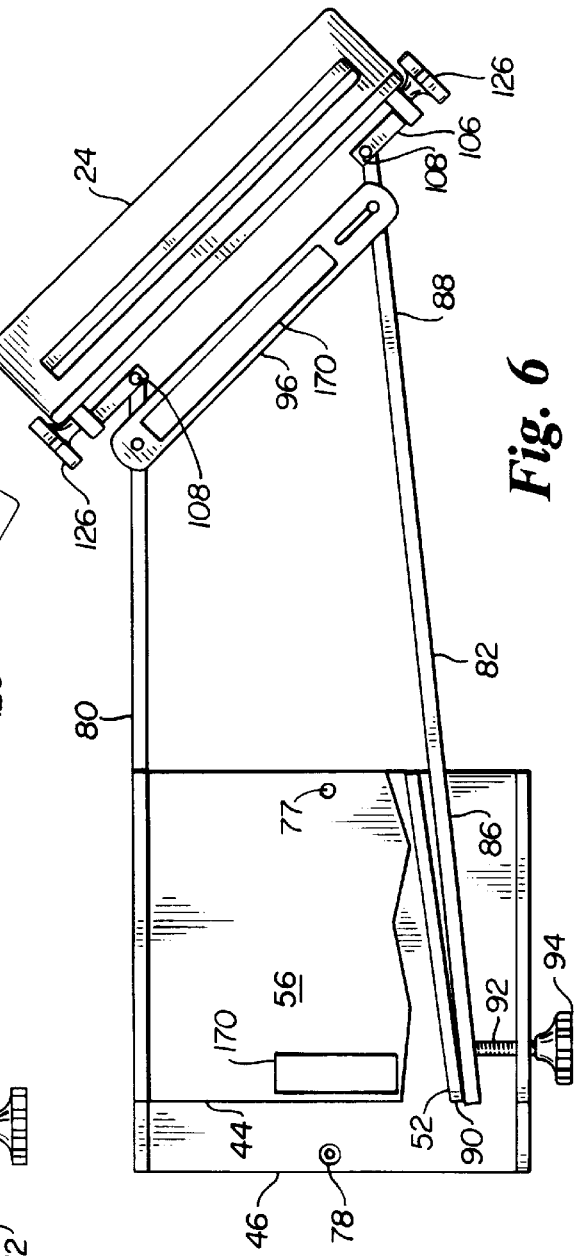
Fig. 5
Fig. 6

ARCHITECTURAL MILLWORK JIG

BACKGROUND OF THE INVENTION

The present invention relates generally to jigs, particularly to jigs for architectural millwork, and specifically to architectural millwork jigs used in combination with power jig saws.

Molding, or strips of molding, are shown in FIGS. 1A through 1G. FIGS. 1A through 1D show crown molding 1. Crown molding is one example of architectural millwork. Crown molding 1 includes an outwardly facing, aesthetically pleasing, design face 2 and a hidden, flat, opposite face 3. Crown molding 1 includes an end or end portion 4 for a left hand cope and an opposite end or end portion 5 for a right hand cope. Crown molding 1 further includes an upper beveled edge 6 for abutting the ceiling 7 and a lower beveled edge 8 for abutting the wall 9. Crown molding 1 further includes a beveled end face 10 for a left hand cope and a beveled end face 11 for a right hand cope. Each of the beveled end faces 10, 11 includes a profile 12 to be coped, with such coping producing a coped end face 13 having the design of the aesthetically pleasing face 2 so that such coped end face 13 matches or form fits with the design of the molding with which it intersects or abuts at a corner. It should be noted that each of the ends 4 and 5 may be coped or that only one of the ends may be coped. A coped end of a molding generally abuts a noncoped end of its adjacent molding. A cope is in the nature of a scribe.

A coping saw is a narrow, short-bladed saw set in a recessed handle and used for cutting designs in wood. A coping saw is shown in FIG. 1A and identified by reference numeral 14. The hand operated coping saw 14 is a conventional tool for coping moldings. Profile 12 is preferably highlighted with a pencil prior to the end face 11 (or 10) being coped. Reference numeral 15 in FIG. 1A shows a space where a portion of the beveled end face 11 has been coped so as to produce the form fitting cut or coped end face 13.

As to crown molding 1, carpenters refer to two angles. A first angle "A" is relative to any of the upper or lower sides 6 or 8 of the crown molding 1. A second angle "B" is relative to either the precut beveled end face 10 or 11. A cut made taking into account both of angles "A" and "B" is known as a compound cut where both of the angles "A" and "B" are oblique.

A flat miter or base molding 16 is shown in FIGS. 1E, 1F and 1G. Base molding 16 abuts the wall 9 and floor 17, as shown in FIG. 1G. Base molding 16 includes a recut beveled end face 18 and, after being coped, includes a coped end face 19.

One prior art coping table is disclosed on page 115 of the book Tricks of the Trades: Building Methods And Materials, Taunton Press, Inc., 1994. This table is a pyramidal box with slots cut into both sides for the molding stock. During a cut, the powered jig saw rides on the angled side of the coping table. The table is made out of a sink cutout from a plastic laminate countertop to permit the saw to glide over the plastic surface. A variable-speed jigsaw is used and a jigsaw with a roller guide and a fine-tooth scroll-cutting blade is recommended. The book further advises using the blade as a power rasp for intricate profiles. The coping table shown in this book permits adjustment neither as to angle "A" nor as to angle "B". This prior art coping table will cut flat copes only, not compound angles. In other words, this prior art coping table will cope only flat miter moldings 16 shown in FIGS. 1E, 1F, and 1G.

SUMMARY OF THE INVENTION

A feature of the present invention is the provision in an architectural millwork jig having a base for supporting a strip of wood to be cut and further having a coping table with a through opening adjacent to which an end face of the strip is placed, of the coping table being swingable about a first axis to permit the surface of the coping table to be aligned with one angle of the end face of the strip to be cut.

Another feature of the present invention is the provision in such an architectural millwork jig, of the coping table being swingable about a second axis to permit the surface of the coping table to be aligned with another angle of the end face of the strip to be cut, with the second axis being transverse to the first axis.

Another feature of the present invention is the provision in such an architectural millwork jig, of the coping table being adjustable in height relative to the base.

Another feature of the present invention is the provision in such an architectural millwork jig, of the table being spaced from the base with a pair of legs.

Another feature of the present invention is the provision in such an architectural millwork jig, of one of the legs being drawable into and out of the base to swing the coping table about one of the axis.

Another feature of the present invention is the provision in such an architectural millwork jig, of the base including a clamp to permit both hands to operate the power jig saw.

Another feature of the present invention is the provision in such an architectural millwork jig, of the clamp being adjustable in height relative to the base and being laterally adjustable relative to the base.

Another feature of the present invention is the provision in such an architectural millwork jig, of the clamp including a resilient portion that confronts and abuts the strip so as not to damage the strip even though the strip is immobilized under pressure.

Another feature of the present invention is the provision in such an architectural millwork jig, of the base including a lateral stop for laterally holding the strip while the strip is held by the clamp.

Another feature of the present invention is the provision in such an architectural millwork jig, of a pair of nonskid roughened surfaces on either side of the clamp to hold the strip in position prior to clamping and to aid in immobilizing the strip when the strip is clamped.

An advantage of the present invention is that the table surface on which the saw foot rides can be used for both right hand copes and for left hand copes.

Another advantage is that the table may be adjusted to be aligned exactly with the angle of the right hand cope (angle "A" for cutting a right hand cope).

Another advantage is that the table may be adjusted to be aligned exactly with the angle of the left hand cope (angle "A" for cutting a left hand cope).

Another advantage is that the table may be adjusted to be aligned with the slope of the bevel (for either right handed or left handed copes).

Another advantage of the present jig is that it copes a compound miter.

Another advantage is that the table may be adjusted to be aligned with the right angle of a flat miter.

Another advantage is that the table may be adjusted to be aligned with the slope of the bevel of the flat miter.

Another advantage of the present jig is that it copes flat miters that are relatively greatly detailed.

Another advantage of the present invention is speed and precision without sacrifice. More moldings may be coped in a less amount of time with at least the same degree of precision as accomplished with a hand operated coping saw. Relative to a nonadjustable coping table, the present jig with its adjustable coping table provides a greater degree of precision because an almost perfect alignment of the coping table with the end face to be cut is made possible. Alignment of the coping table can be made quickly.

Another advantage is safety. The molding may be lifted directly from the floor to the base without a swinging about the room and then clamped to the base with the end face to be cut generally disposed near the coping table. Subsequent operations may be merely sliding the molding along the base to more closely draw the end face to the coping table and adjusting the coping table about one or more of the two swingable axis. In short, the coping table of the present invention is alignable with the molding, not the molding with the table.

Safety is further enhanced by the inclusion of a clamp. The provision of a clamp permits two hands instead of one to operate the relatively dangerous power jig saw.

Another advantage is that the present jig is inexpensive and simple to manufacture.

Another advantage is that the present jig is simple to use.

Another advantage is efficiency. The carpenter often charges by the job, not the hour. A carpenter may make literally dozens of time consuming copes a day. With the present jig, the time for one cope is cut at least in half.

Another advantage is an increase in quality. One feature providing this advantage is the adjustable table face to permit an almost perfect alignment with the compound cut. Further, quality is enhanced because the jig holds the molding. The carpenter may focus solely on making the cut along the profile. He or she is doing one thing (cutting the complex profile) instead of doing two things (manually holding the strip with enough strength to immobilize the strip and manually cutting the complex profile).

Another advantage is consistency. The same cut can be time and time again with the coping table fixed in position.

Another advantage is that almost all, if not all, types and varieties of crown and base moldings may be coped.

These and further objects and advantages of the present invention will become clearer in light of the following detailed description of the illustrative embodiments of this invention described in connection with the drawings.

BRIEF DESCRIPTION OF THE DRAWINGS

The illustrative embodiments may be best described by reference to the accompanying drawings where:

FIG. 5 is a top plan, partially phantom view of the jig of FIG. 3 and shows the coping table of the jig being swung in one direction for a left hand cope.

FIG. 6 is a top plan, partially cut away view similar to the view of FIG. 5 and shows the coping table being swung in the other direction for a right hand cope.

DESCRIPTION

Figure 1A:
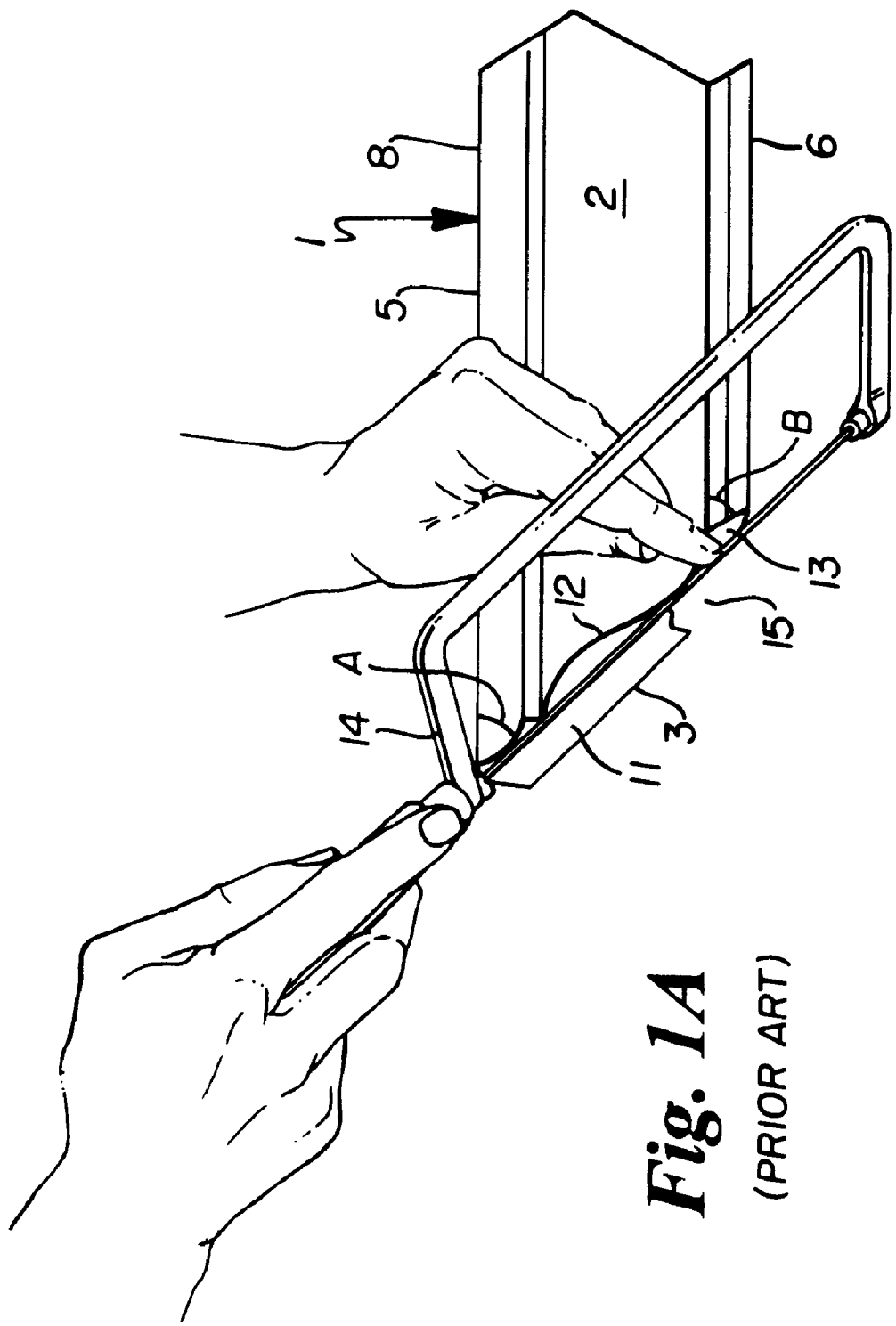
FIG. 1A is a perspective view of a prior art hand operated coping saw cutting an end face of a strip of architectural millwork, specifically crown molding.
Figure 1D:
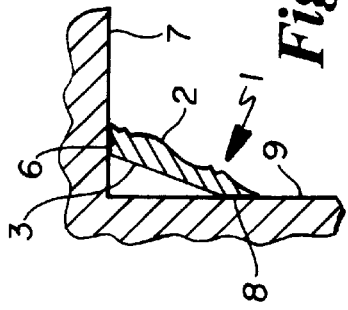
FIG. 1D shows the crown molding of FIG. 1B in place between a ceiling and a wall.
Figure 1C:
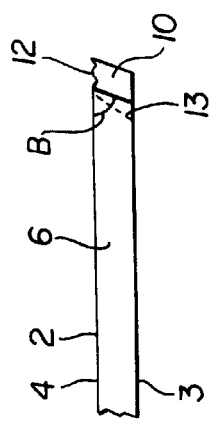
FIG. 1C is an elevation view of an edge of a left hand portion of the crown molding of FIG. 1B and shows the bevel of the end face.
Figure 1B:
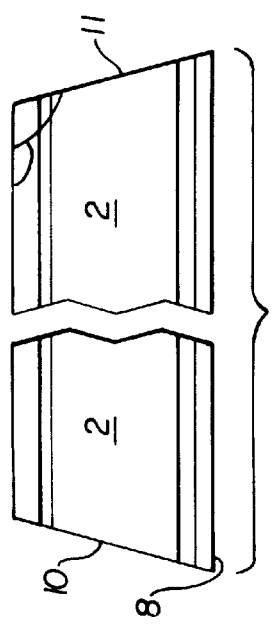
FIG. 1B is an elevation view of the face of a left hand end portion of crown molding and the face of a right hand end portion of crown molding.
Figure 1G:
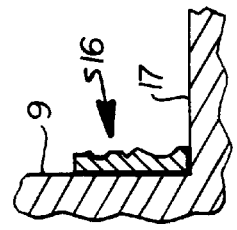
FIG. 1G shows the flat miter molding in place at the intersection of a wall and floor.
Figure 1F:
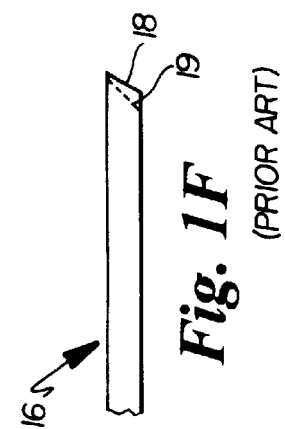
FIG. 1F is an elevation view of an edge of the flat miter molding of FIG. 1E.
Figure 1E:
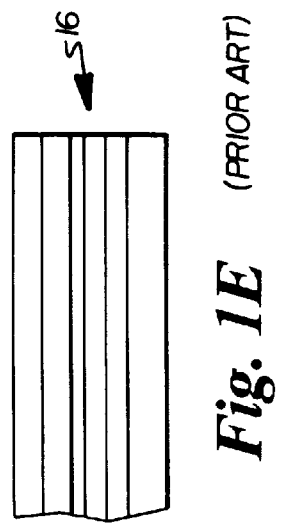
FIG. 1E is an elevation view of the face of flat miter molding.
Figure 2:
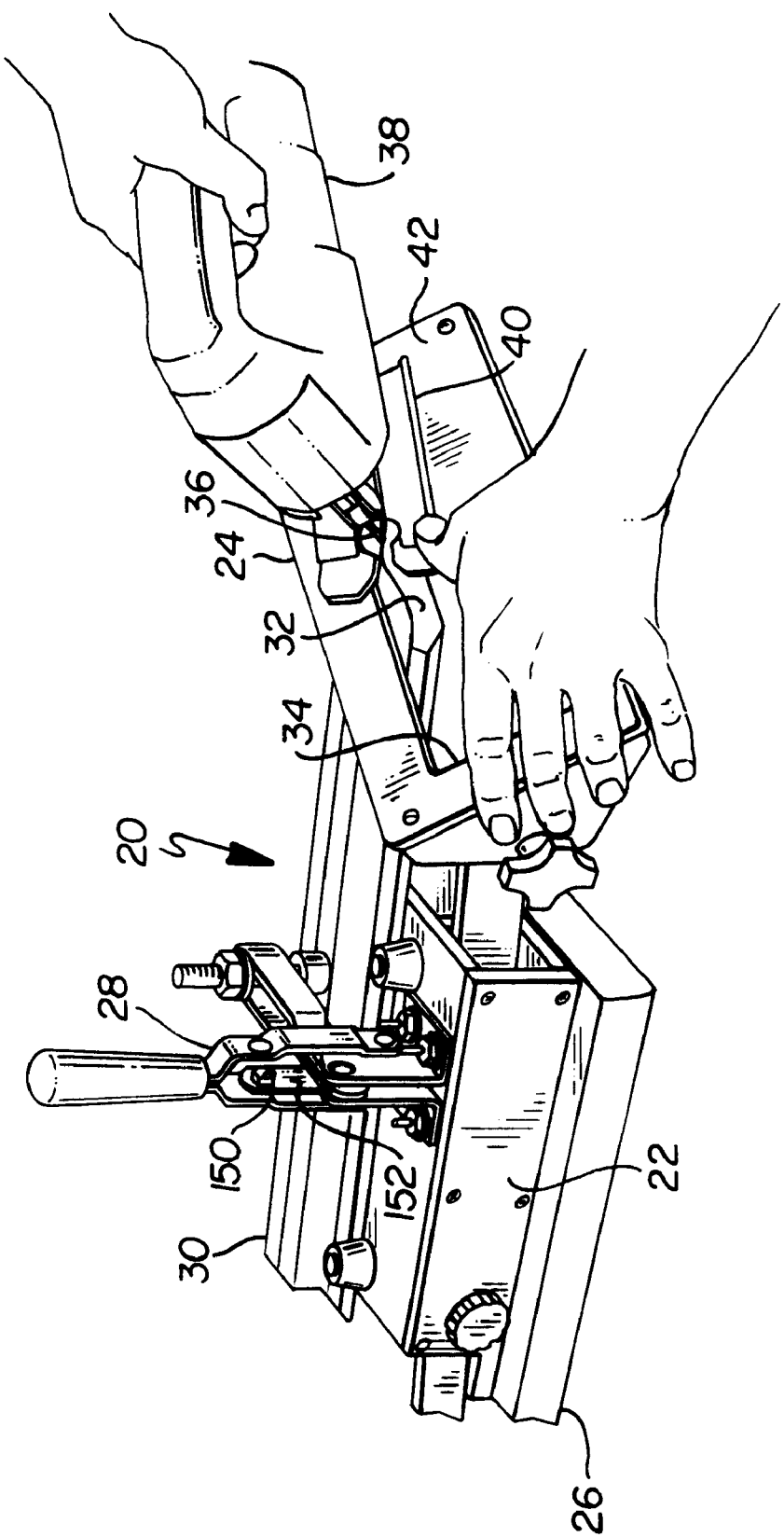
FIG. 2 is a perspective view of the present jig holding a strip of architectural millwork while the end face of the strip is being cut by a power jig saw.

As shown in FIG. 2, the present jig 20 generally includes a base 22 and a table 24. The base 22 is fixed to a workbench 26. The base 22 includes a clamp 28 that releasably immobilizes a molding strip 30 having an end face 32. The end face 32 is disposed near a through opening 34 formed in the table 24. The end face 32 is cut by the reciprocating blade 36 of a power jig saw 38. The power jig saw 38 includes a foot 40 that rides on a face or surface 42 of the table 24 about the through opening 34. The blade 36 of the power jig saw 38 reciprocates between the toes of the foot 40.

Figure 3:
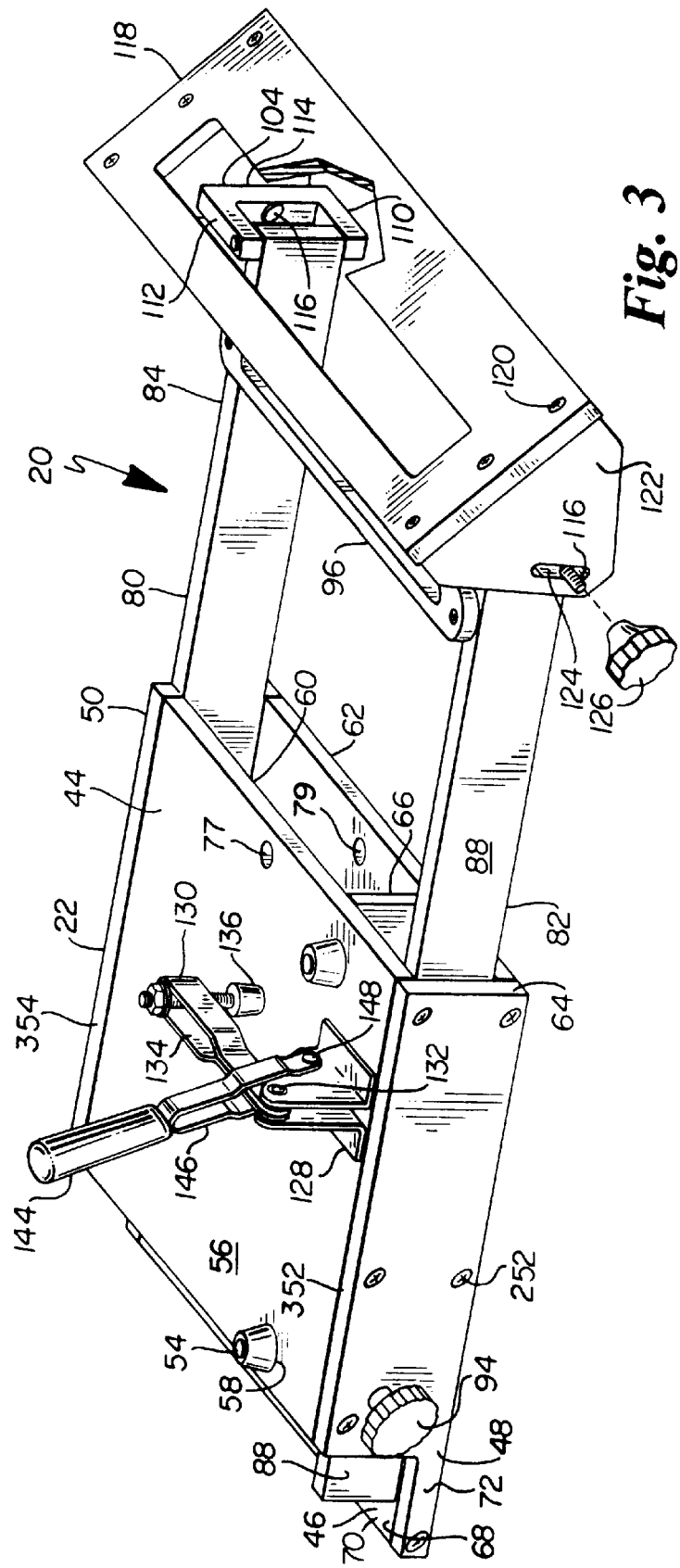
FIG. 3 is a perspective detail partially cut away view of the jig of FIG. 2 and shows the coping table in position for coping flat miter molding.

More specifically, as shown in FIG. 3, the base 22 includes an upper base plate 44 and a lower base plate 46 fixedly spaced apart in generally parallel fashion by a pair of side base plates 48 and 50. Pin connectors 252, such as removable screws, run from the side base plates 48 and 50 into the upper and lower base plates 44, 46. An interior base plate 52 (shown in FIG. 6) further spaces the upper and lower base plates 44, 46 apart and may be fixed therebetween by pin connectors 54 (shown in FIGS. 3 and 5). Or pin connectors may run into interior base plate 52 from the lower base plate 46. Interior base plate 52 is obliquely positioned relative to side base plates 48 and 50. Plate 52 is a spacer (for the upper and lower base plates 44 and 46), a guide (for the drawable leg 82), and an abutment (against which movable leg 82 is pinched by pin 92). Another embodiment of the invention includes side base plates 48, 50 and interior plate 52 of the same height, with upper and lower base plates 44 and 46 running over and under all three plates 48, 50, 52 such that pin connectors are driven from the upper and lower base plates 44 and 46 into the three plates 48, 50, 52 sandwiched therebetween.

Each of the side base plates 48 and 50 includes a respective upper edge 352, 354 that is flush with an upper face or surface 56 of upper plate 44 such that strip 30 may slide smoothly. Upper face or surface 56 includes a generally first direction defined by a pair of lateral stops or bumpers 58 formed of a rubber or polyurethane like material or, more preferably, a hard plastic (such as PVC). If formed of rubber or polyurethane like material, bumpers 58 are resilient. Each of the lateral stops 58 is held on the upper plate 44 via its respective pin connector 54. Each of the lateral stops or resilient bumpers 58 is frustoconical or, preferably, cylindrical in shape. When frustoconical, bumper 58 tapers upwardly to minimize contact between the relatively delicate molding and the bumper. Lateral stops 58 minimize a pivoting of strip 30 when pressure is applied to end face 32, such as when end face 32 is cut.

Upper and lower base plates 44 and 46 include respective front edges 60, 62 that are generally flush with front edge 64 of side base plate 48 and front edge 66 of interior base plate 52. Lower base plate 46 has a length greater than upper base plate 44 such that a ledge 68 is formed. Ledge 68, an extension of lower base plate 46, shares an upper surface 70 with lower base plate 46 and this upper surface 70 is flush with extensions 72 and 74 (shown in FIG. 5) of respective side base plates 48 and 50. As shown in FIGS. 5 and 6, ledge 68 includes an opening 76 for permitting the reception of a pin connector 78 such as a wood screw to permit the base 22 and jig 10 to be fixed to the workbench 26. Jig 20 may also be fixed to the workbench 26 via ledge 68 with a clamp such as a C-clamp. Upper base plate 44 includes a hole 77 for a screwdriver for screwing a pin connector such as a wood screw into workbench 26 via a hole 79 formed in a front portion of lower base plate 46. Base 22 thus may be fixed at both of its ends relative to the workbench 26.

The coping table 24 is engaged to the base 22 via a pair of respective legs 80, 82. Leg 80 is an integral extension of side base plate 50. Leg 80 is fixed. Leg 80 includes a distal end portion 84. Leg 82 is drawable into and out of the base 22. Leg 82 includes a proximal end portion 86 and a distal end portion 88. Proximal end portion 86 slides between the upper and lower base plates 44 and 46 and against a rear end 90 of oblique interior base plate 52. Leg 82 further slides on ledge 68 and on edge 72. The position of leg 82 is releasably fixed by a turn screw 92 having a handle or knob 94. Turn screw 92 is threadingly engaged with side base plate 48 and brings pressure to bear on one side of leg 82 to pinch leg 82 against end 90 of oblique interior base plate 52.

Figure 8:
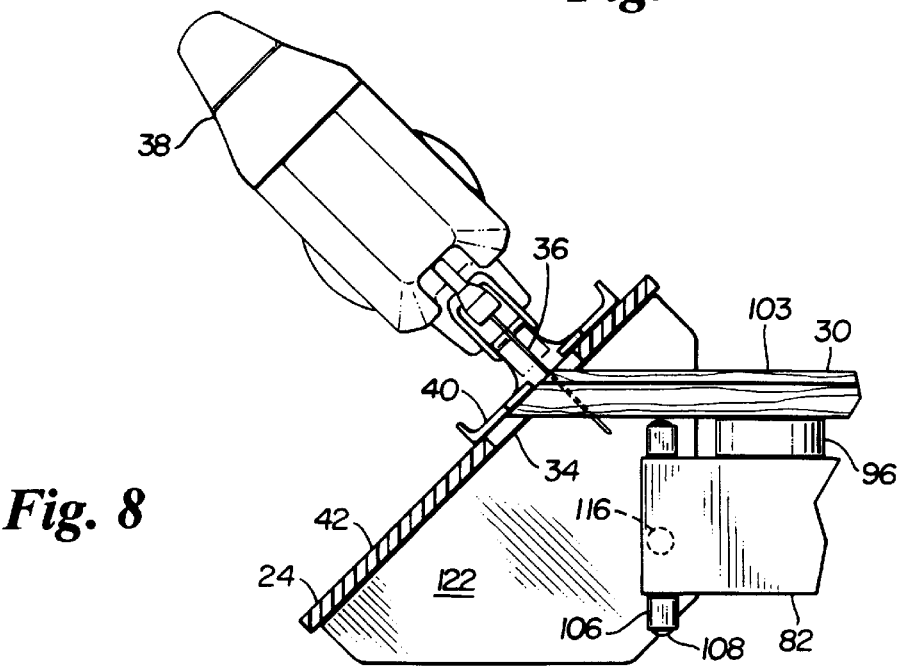
FIG. 8 is a side view, partially in section, of the jig of FIG. 3 showing how the surface of the coping table may be aligned with the beveled face of the molding.

Legs 80 and 82 are relatively fixed apart by an arm or slotted brace 96. One end of arm 96 is pivotally fixed to leg 80 via a pivot pin 98. The other end of arm 96 is pivotally and slidably fixed to leg 82 via a pivot pin 100. Arm 96 may slide relative to leg 82 via a slot 102 running in the generally lateral direction of jig 10 and along the length of arm 96. Arm 96 stabilizes the legs 80, 82 relative to each other while permitting some give in the width between the distal end portions 84, 88 of the legs 80, 82. Arm 96 may further support and stabilize an end portion 103 of strip 30. Strip end portion 103 includes the end face 32 being cut, as shown in FIG. 8. Clamp 28 actually exerts a clamping pressure on arm 96 through strip 30.

Respective U-shaped or C-shaped hinges or joints 104, 106 are engaged between legs 80, 82 and the table 24. Each of the joints 104, 106 is pivotally engaged to respective leg distal end portions 84, 88 via pivot pins 108. Each of the U-shaped joints 104, 106 includes a lower extension 110, an upper extension 112 and a base portion 114. Each of the lower and upper extension 110, 112 includes one pivot pin 108 which in turn runs into its respective leg 80 or 82. Fixed in each respective base portion 114 and extending outwardly is a threaded pin 116.

Table 24 is engaged to legs 80, 82 by the threaded pins 116. Table 24 includes an operating table plate 118 rigidly fixed via pin connectors 120 to side table plates 122. Each of the side table plates 122 includes a slot 124 formed therein and through which pin 116 extends. Slot 124 runs generally in the vertical direction when operating table plate 118 is disposed at generally a 45 degree angle relative to base surface 56. A handle or knob 126 is threadable onto fixed pin 116 and pinches its respective side table plate 122 against its respective base portion 114 of its respective joint 104, 106 to fix the table 24 at one position relative to legs 80, 82.

Operating table plate 118 includes slot or through opening 34 and further includes table surface 42 running about through opening 34. The heads of pins 120 are preferably recessed relative to surface 42 to provide a relatively smooth surface for the foot 40 of the power jig saw 38. The width and length of the through opening 34 is preferably sufficiently great to permit free movement of saw blade 36.

Jig 20 further includes a toggle clamp 28. Clamp 28 includes a pair of angle iron like framing members 128 that are fixed to upper base plate 44. A clamping arm 130 is pivotally fixed between the framing members 128 via pin 132. Clamping arm 130 loops laterally out and back to framing members 128 and in doing so forms a laterally extending slot 134. A resilient bumper 136 for abutting molding strip 30 is fixed to a bottom portion of a threaded pin 138. Threaded pin 138 is adjustable both in the lateral and vertical direction relative to base surface 56 via a pair of respective upper and lower nuts 140, 142. Each of the nuts 140, 142 may be paired with a respective locking washer or locking nut ill the engagement with arm 130. Bumper 136 is laterally adjusted by loosening at least one of the nuts 140, 142 and sliding the pin 138 in the lateral direction of slot 134. Bumper 136 is vertically adjusted by loosening one of the locking nuts or wing nuts and turning pin 138. Moldings come in a great variety of shapes and sizes and it is preferable to find a relatively nondelicate or nondesign portion of the face of the molding strip 30 against which to abut the lower resilient surface of resilient bumper 136.

Clamp 28 further includes a handle 144 and a forked handle frame 146. A distal end of each of the forks of frame 146 is pivotally fixed to one angle iron framing member 128 via pins 148. A proximal end of each of the forks is pivotally fixed via pins 150 to an over center locking or toggle arm 152. Each over center locking arm 152 extends from its respective pivot pin 150 to be pivotally fixed to clamping arm 130. Such an over center locking or toggle mechanism releasably immobilizes strip 30 against base surface 56 and against lateral stops 58 so that end face 32 may be precisely and safely cut.

In operation, strip 30 is first cut by a miter Lox so as to generate angle "A" and angle "B." Then strip 30 is engaged with jig 20. In jig 20, strip 30 is placed on base surface 56 and against lateral stops 58 such that end face 32 extends generally adjacent to through opening 34 of table 24. Then clamp 28 is operated to immobilize strip 30 and pinch strip 30 to base 22 so that strip 30 extends generally in the longitudinal direction defined by lateral stops 58. Then arm 82 is drawn into and out of base 22 so as to swing table 24 and table surface 42 about a generally vertical (or first or second) axis defined by pivot pins 108. This swinging action aligns the table surface 42 with the angle of the end face 32 relative to side edges 154 of strip 30. This swinging action is seen by comparing FIGS. 5 and 6. In FIG. 5, arm 82 is relatively drawn in. In FIG. 6, arm 82 is relatively drawn out. This swinging action effectively occurs about two vertical axes, each at a respective distal end portion 84, 88 of legs 80, 82 and each defined by a pair of upper and lower pins 108 on respective U-shaped joints 104, 106. This swinging action is shown by comparing FIGS. 5 and 6. This swinging action provides for right hand copes and left hand copes. This swinging action provides for adjustment of the angle of the right hand cope and for adjustment of the angle of the left hand cope. This swinging action provides for adjustment relative to angle "A" indicated in FIG. 1. This swinging action also brings the coping table 24 into position (shown in FIG. 3) for alignment with a flat miter. When the table 24 is properly aligned as to this axis, knob 94 is operated.

Figure 4C:
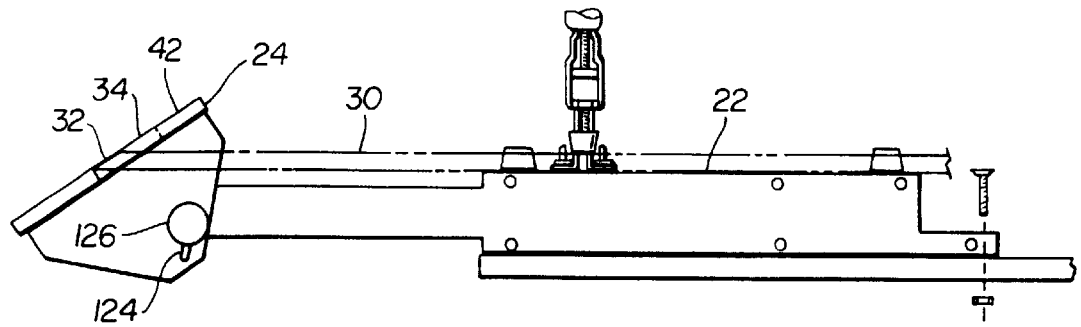
FIG. 4C is a side elevation view similar to the view of FIG. 4A and shows how the slope of the coping table may be adjusted to cope flat miter, with the coping table being lowered relative to the base to permit the end face of the molding to float in the slot of the coping table.

Then, or prior to swinging about pins 108, the table 24 and its table surface 42 may be swingably adjusted about a horizontal (or first or second) axis defined by pins 116 and generally defined by knobs 126. This horizontal axis of this swinging action is provided by pins 116 and is transverse to the vertical axis provided by pins 108. This swinging action aligns the table surface 42 with the precut angle of the end face 32 relative to faces 156 of strip 30 or, if desired, with the (intended) postcut angle of end face 32. This swinging action adjusts the slope of table 24 and its table surface 42 to match or be aligned with the precut or post cut slope of the end face 32. This swinging action is shown by a comparison between FIGS. 4A and 4B. This swinging action provides for adjustment as to angle "B" shown in FIG. 1. As indicated by such a comparison, table 24 may be adjusted in height when adjusted in slope to permit end face 32 to "float" in slot 34 (i.e. to be spaced from edges of table plate 118 forming the slot or through opening 34). A lesser slope to the precut bevel, shown in FIG. 4B for example, may require the table 24 to be raised relative to base 22 to permit the end face 32 to float in slot 34. A greater slope for the precut bevel, shown in FIG. 4A for crown molding for example, may require the table 24 to be lowered relative to base 22 to permit such a floating. A still greater slope for the precut bevel is shown in FIG. 4C. FIG. 4C shows in general the position of the coping table 24 for coping flat miter, where the coping table 24 is lowered to permit the end face of the flat miter molding to float in through opening 34. When swinging and alignment about this axis is complete, knob 126 is operated.

Figure 4A:
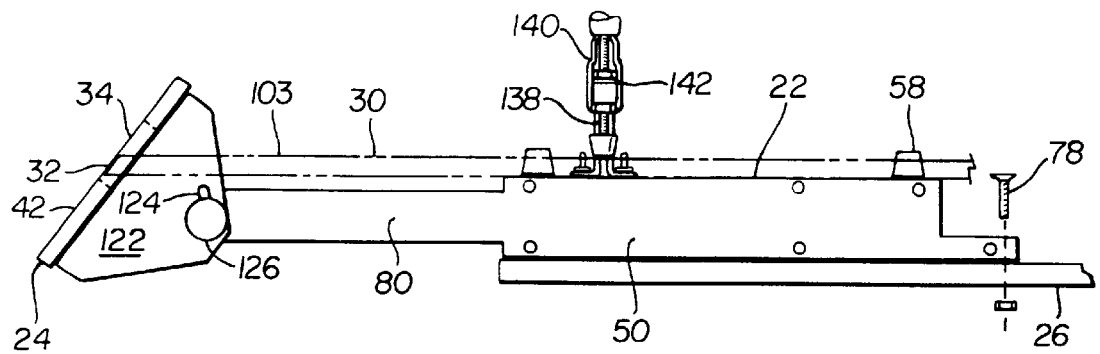
FIG. 4A is a side elevation view of the jig of FIG. 3 fixed to a work bench and shows a strip of molding on the base of the jig and the end face of the strip adjacent to the coping table of the jig.
Figure 4B:
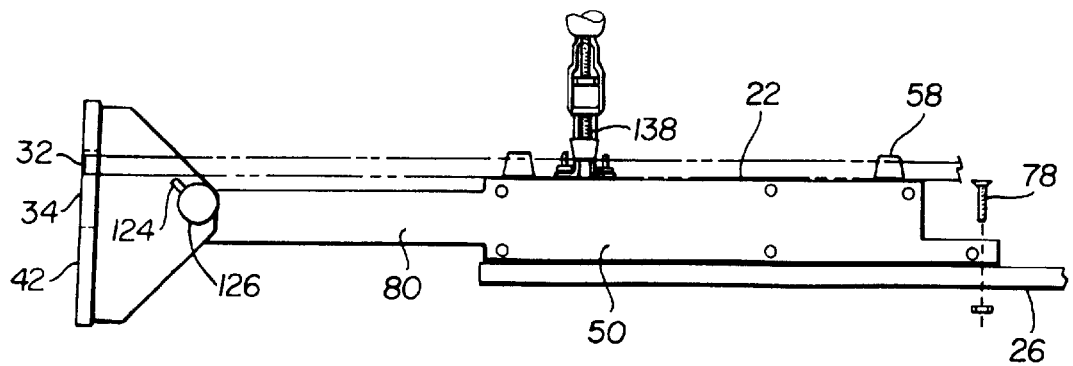
FIG. 4B is a side elevation view similar to the view of FIG. 4A and shows how the slope of the table of the present jig may be adjusted to make cuts of different slopes at the end face of the strip of millwork, with the coping table being raised relative to the base to permit the end face of the molding to float in the slot of the coping table.

A height adjustment of table 24 may take place prior to the swinging about pins 108, or prior to the swinging about pins 116, or prior to swinging about any of pins 108 and 116. The height of table 24 may be adjusted by loosening both knobs 126 and adjusting table 24 up or down and permitting pins 116 to slide in their respective slots 124. FIG. 4C shows a relatively low position for table 24. FIG. 4B shows a relatively high position. FIG. 4A shows a position therebetween.

Knobs 94 and 126 may be loosened and retightened and loosened and retightened again to adjust table 24.

Figure 7:
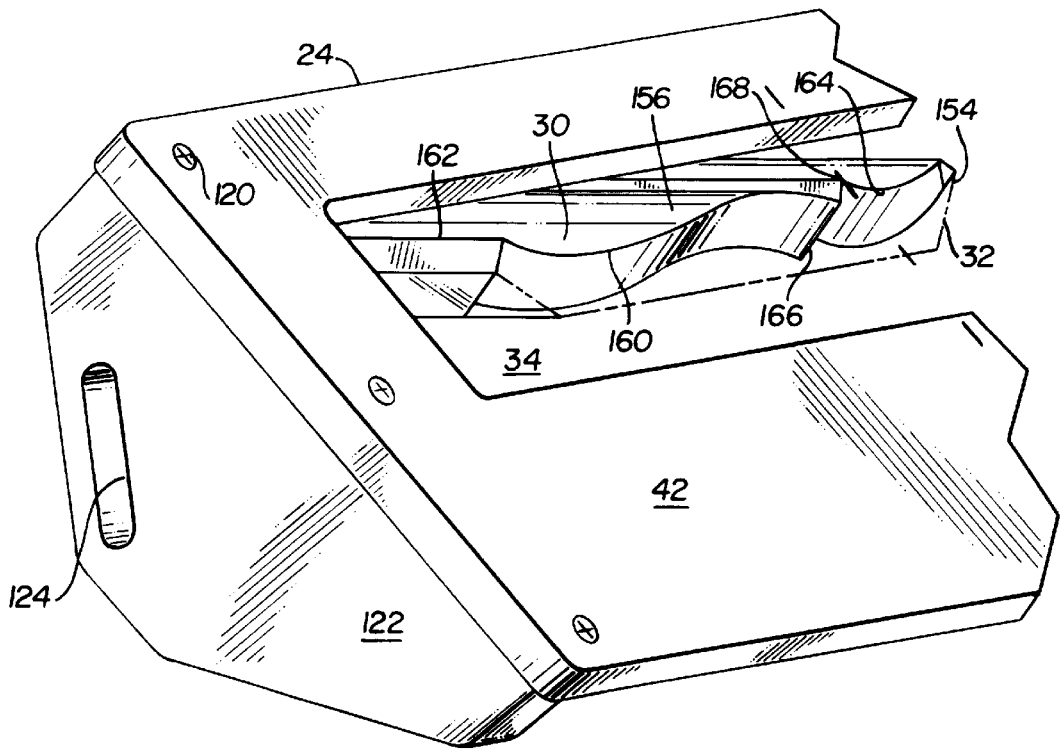
FIG. 7 is a detail perspective view of the coping table of the jig of FIG. 3.

When properly aligned utilizing such swinging action about one or more of the two axis, detailed, fast and clean cutting with the electric jig saw 38 is easily accomplished. The detail is shown by a complex or tortous line 160 (or profile 160) in FIG. 7. This complex line 160 includes straight cut portions 162, curved portions 164, point cuts 166, and V-like cuts 168.

Such a cutting along line 160 is also an undercutting to provide the desired joint or mate between two strips of millwork at a corner. Such an under cutting may be done at generally any angle relative to each of the faces 156 of strip 30. More preferably, such a back or under cutting is between about 10 degrees to about 45 degrees relative to the faces 156 of strip 30, depending upon whether crown or base molding is being cut.

With the present jig 20, the saw foot 40 rides on the table face 42, not on the end face 32 of the strip 30. The end face 32 is clamped below or interiorly of table face 42. Jig saw 38 vibrates and the table 24 and jig 20 as a whole absorb this vibration, not end face 32.

Alignment of the table 24 about the vertical axis defined by pins 108 permits the blade 36 and saw foot 40 to follow the profile cut 160. Alignment of the table 24 about the horizontal axis defined by pins 116 permits the blade 36 and saw foot 40 to follow the bevel cut (the precut end face 32).

End faces 32 cut pursuant to the present invention and pursuant to alignment about one or more axis of table 24 produce finished cuts that required no further attention such as rasping or sanding.

It should be noted that base 22 and table 24 may be formed of aluminum, wood, plastic or other material that is relatively light and produces flat and smooth surfaces. Plastic is preferred. A hard plastic such as PVC is even more preferred.

Architectural millwork means crowns, coves, base (flat miters) and bed moldings. The present jig 20 copes all such millwork.

It should be noted that a primary purpose of the present jig is to cope crown and base moldings with a power jig saw. Table 24 may be set at angles parallel to the compound angles cut on crown molding. One parallel angle is the angle of face 32 relative to the side edges 154 of strip 30 (angle "A"), and the attendant angle of table 24 for this parallel angle may be set by a pivoting of table 24 about pins 108. The other parallel angle (or slope) of table 24 is the angle (or slope) of face 32 relative to the faces 156 of strip 30 (angle "B"), and the attendant angle of table 24 for this parallel angle may be set by a pivoting of table 24 about pins 116. Table 24 is adjustable to follow the angle of the cut (relative to side edges 154) and the slope of the bevel (relative to faces 156).

FIG. 8 shows that when the table 24 is swung to follow the bevel of end face 32, jig saw blade 36 makes a cut generally perpendicular to the bevel. This undercuts the molding, removing a sufficient amount of waste to allow the faces of two strips to meet at a 45 degree angle.

It should be noted that end face 32 "floats" in slot 34 vibration free throughout the cutting process. Even if end face 32 protrudes slightly into slot 34 (without protruding through slot 34), no portions of end face 32 or strip 30 make contact with the edges of table plate 118 that form the slot 34.

It should be noted that generally rectangular nonskid strips 170 may be glued to the brace 96 and to a rear portion of base upper plate 44, as shown in FIGS. 5 and 6. Nonskid strips 170 have a roughened upper surface and aid the clamp 28, on either side of the clamp 28, in immobilizing the strip 30 when the strip 30 is cut. Nonskid surfaces further aid in holding strip 30 in place prior to engagement of clamp 28.

If desired, it should be noted that leg 80 may be replaced with a leg similar to leg 82 so that each of the legs may be drawable into and out of the base 22. Such may minimize a sliding adjustment of strip 30 in the longitudinal direction.

Carpenters spend hour after tedious hour gnawing through hardwood crown and base moldings. By the end of the day, a carpenter may feel as though he or she is cutting hardwood beams rather than intricately figured moldings.

Crown moldings are typically wide, and when installed normally stand 45, 32, or 30 degrees to plumb and require a compound angle when mitered. Because of its width and angle to the wall, a severe back cut is usually necessary when cutting a coped miter, even cutting with a coping saw held at an acute angle is no guarantee that enough waste will be removed from the back of the molding.

Such a back cut can be done in many ways. Sometimes it is made by clamping the molding upside down on a bench and then hogging out the back with a circular saw. Other times it is made by abrasive planes, belt sanders and table saws. The list goes on and on and all of these techniques still require a finished cut by hand with a coping saw and, more often than not, fine tuning with a rasp. Whatever the method, they are all extremely time consuming and add significantly to job site air born particulates.

The present jig allows one to accurately cut perfectly coped compound and flat miters with a jig saw. Fitted with a narrow, fine-toothed blade, the present jig permits the cutting of cope after cope with no need for further fine tuning. Even homeowners with little carpentry knowledge or experience can easily cope compound miters.

The present jig is used by cutting a 45 degree inside miter to expose the profile. Crown moldings are placed in the miter box upside down (with the design face up) and backwards. This may be perceived by thinking of the coping table of the jig as the ceiling and the lateral stops (or fence) as the wall. Next, square the bottom of the molding. Then, adjust the table to the angle of the exposed profile and then tilt the table so that the table is parallel to the bevel. By positioning the molding behind the face of the table, the foot of the powered jig saw will not come into contact with the molding. Further, it is preferred that the end of the molding "floats" in the opening.

Since the stock is isolated from both the jig saw's foot and the coping table, the saw's vibrations are absorbed by the table, the legs of the table and the base of the jig, not the piece being cut. Therefore, the jig saw foot cannot mar or burnish the face of the profile.

With the table set parallel to the compound angle's bevel, the blade of the saw under cuts the crown molding at about a 35 degree angle. One cuts to the profile's shape, under cutting and coping in one operation with the powered jig saw.

To cut a right hand cope on the other end of the molding, the molding is turned end for end and, again, the table is adjusted to the exposed profile. There is no need to readjust the bevel. Then the molding is clamped in the present jig and the cut is made.

To cope base moldings for an inside 90 degree corner, cut a 45 degree miter, place the stock in the present jig, adjust the coping table so that the table is parallel to the miter, then tilt the coping table a few degrees from the horizontal, such as about 15 degrees. Then clamp and cut the piece. The slight tilting of the coping table allows for a slight under cut. The present jig remains in this position for both right hand and left hand flat miters.

The present jig is intended for the finish carpenter, but may be used by the inexperienced homeowner. The present jig turns a power jig saw, commonly used for rough cuts and commonly found on almost all job sites, into a fine finish tool where the teeth of the blade are merely relatively fine.

The present jig takes the mystery out of cutting crown moldings for the homeowners and do-it-yourselfers and saves carpenters and contractors time and money.

Thus since the invention disclosed herein may be embodied in other specific forms without departing from the spirit or general characteristics thereof, some of which forms have been indicated the embodiments described herein are to be considered in all respects as illustrative and not restrictive. The scope of the invention is to be indicated by the appended claims, rather than by the foregoing description, and all changes which come within the meaning and range of equivalents of the claims are intended to be embraced therein.

What is claim is:

1. A jig for supporting a strip while one end face of the strip is being cut with a powered jig saw cutting into the end face of the strip, with the powered jig saw comprising a foot having two toes and a blade reciprocating between the two toes, with the strip comprising two ends, with each of the ends of the strip comprising one end face, with the jig comprising, in combination:

a) a base, wherein the base comprises a first surface running in a first direction;

b) a clamp, wherein the clamp is fixed relative to the base for clamping the strip on the first surface of the base such that the strip is clamped in the first direction;

c) a table engaged to the base, wherein the table comprises a face and a through opening, with the through opening of the table being generally aligned with the first direction such that the strip is generally alignable with the through opening of the table and such that one end face of the strip is disposed adjacent to the through opening of the table when the strip is clamped to the base whereby said end face of the strip is cut with the blade of the powered jig saw while the foot of the jig saw rides on the face of the table about the through opening of the table;

d) wherein the table is swingable about a first axis such that the table is aligned with said end face of the strip that is to be cut;

e) wherein the table further comprises a pair of legs to space the table from the base, with the table being swingable relative to each of the legs and with at least one of the legs being drawable to and away from the base to swing the table relative to the base; and f) wherein the table comprises edges forming the through opening, wherein the first direction comprises a first straight line flush with the first surface of the base, and wherein the first straight line when extended in a straight line extends to the through opening to be disposed in the through opening and spaced from the edges of the through opening.

2. The jig according to claim 1, wherein the table is swingable about a second axis, with the second axis extending in a direction transversely to said first axis.

3. The jig according to claim 1, wherein the face of the table lies generally in a plane and includes lateral and longitudinal directions, and wherein the first axis runs in the longitudinal direction of the face of the table such that the table is swingable about a longitudinal axis.

4. The jig according to claim 1, wherein the face of the table lies generally in a plane and includes lateral and longitudinal directions, and wherein the first axis runs in the lateral direction of the face of the table such that the table is swingable about a lateral axis.

5. The jig according to claim 1, wherein the face of the table lies generally in a plane and includes lateral and longitudinal directions, and wherein:

a) the first axis runs in the longitudinal direction of the face of the table such that the table is swingable about a longitudinal axis; and b) the table comprises a second axis running in the lateral direction of the face of the table such that the table is swingable about a lateral axis.

6. The jig according to claim 1, wherein the table further comprises two generally upper and lower edges, with at least one of the edges swingable to and away from the base to provide for swinging about the first axis.

7. The jig according to claim 1, wherein the table further comprises two general side edges, with at least one of the edges being drawable to and away from the base to provide for said swinging about the first axis.

8. The jig according to claim 1, wherein the table includes a height relative to the base, with the height of the table relative to the base being adjustable.

9. The jig according to claim 1, wherein the table farther comprises a leg to space the table from the base and to permit the table to be swung in a space between the table and the base.

10. The jig according to claim 1, wherein the table further comprises a leg to space the table from the base, with the leg being drawable to and away from the base to swing the table relative to the base.

11. The jig according to claim 1, wherein the table further comprises a pair of leg to space the table from the base, and wherein the jig further comprises a brace engaged between the legs, with the brace including an upper surface for confronting and supporting the end of the strip to be cut.

12. The jig according to claim 1, wherein the base comprises a lateral stop for confronting the strip and for limiting movement of the strip in a lateral direction.

13. The jig according to claim 1, wherein the clamp comprises a clamping end, with the clamping end being adjustable in height relative to the base whereby the clamp is adjustable for relatively thick strips and whereby a pressure of the clamp on the strip is adjustable.

14. The jig according to claim 1, wherein the clamp comprises a clamping end, with the clamping end being adjustable laterally relative to the base.

15. The jig according to claim 1, and further comprising roughened surface portions to minimize skidding of the strip, with one of the roughened surface portions being disposed on the jig relatively adjacent to the table and with the other roughened surface portion being disposed on the base.

16. The jig according to claim 1, and further comprising the strip in combination with the jig, with the strip comprising a strip of architectural millwork.

17. A jig for supporting a strip while one end face of the strip is being cut with a powered jig saw cutting into the end face of the strip, with the powered jig saw comprising a foot having two toes and a blade reciprocating between the two toes, with the strip comprising two ends, with each of the ends of the strip comprising one end face, with the jig comprising, in combination:

a) a base, wherein the base comprises a first surface running in a first direction;

b) clamp, wherein the clamp is fixed relative to the base for clamping the strip on the first surface of the base such that the strip is clamped in the first direction;

c) a table engaged to the base, wherein the table comprises a face and a through opening, with the through opening of the table being generally aligned with the first direction such that the strip is (generally alignable with the through opening of the table and such that one end face of the strip is disposed adjacent to the through opening of the table when the strip is clamped to the base whereby said end face of the strip is cut with the blade of the powered jig saw while the foot of the jig saw rides on the face of the table about the through opening of the table;

d) wherein the table is swingable about a first axis such that the table is aligned with said end face of the strip that is to be cut;

e) wherein the first axis is adjustable in height relative to the base; and f) wherein the table comprises edges forming the through opening, wherein the first direction comprises a first straight line flush with the first surface of the base, and wherein the first straight line when extended in a straight line extends to the through opening to be disposed in the through opening and spaced from the edges of the through opening.

18. A jig for supporting a strip while one end face of the strip is being cut with a powered jig saw cutting into the end face of the strip, with the powered jig saw comprising a foot having two toes and a blade reciprocating between the two toes, with the strip comprising two ends, with each of the ends of the strip comprising one end face, with the end faces having one angle relative to sides of the strip and with the end faces having another angle relative to faces of the strip, with the jig comprising, in combination:

a base, wherein the base comprises a first surface running in a first direction, and wherein the strip is disposable on the first surface of the base in the first direction;

b) a table engaged to the base, wherein the table comprises a flat face and a through opening extending through the flat face, with the through opening of the table being generally aligned with the first direction such that the strip is generally alignable with the through opening of the table and such that one end face of the strip is disposed adjacent to the through opening of the table when the strip is on the base whereby said end face of the strip is cut with the blade of the powered jig saw while the foot of the jig saw rides on the flat face of the table about the through opening of the table;

c) wherein the table is swingable about first and second axes such that the table is aligned with each of the angles of said end face of the strip that is to be cut, with the first and second axes running transversely to each other; and d) wherein the table comprises edges forming the through opening, wherein the first direction comprises a first straight line flush with the first surface of the base, and wherein the first straight line when extended in a straight line extends to the through opening to be disposed in the through opening and spaced from the edges of the through opening.

19. The jig according to claim 18, wherein the table includes a height relative to the base, with the height of the table relative to the base being adjustable.

20. A jig for supporting a strip while one end face of the strip is being cut with a powered jig saw cutting into the end face of the strip, with the powered jig saw comprising a foot having two toes and a blade reciprocating between the two toes, with the strip comprising two ends, with each of the ends of the strip comprising one end face, with the jig comprising, in combination:

a) a base, wherein the base comprises a first surface running in a first direction;

b) wherein the strip is disposed on the first surface of the base such that the strip is disposed in the first direction;

c) a table engaged to the base, wherein the table comprises a face and a through opening, with the through opening of the table being generally aligned with the first direction such that the strip is generally alignable with the through opening of the table and such that one end face of the strip is disposed adjacent to the through opening of the table when the strip is on the first surface of the base whereby said end face of the strip is cut with the blade of the powered jig saw while the foot of the jig saw rides on the face of the table about the through opening of the table;

d) wherein the table is swingable about a first axis such that the table is aligned with said end face of the strip that is to be cut;

e) wherein the table further comprises a pair of legs to space the table from the base, with the table being swingable relative to each of the legs and with at least one of the legs being drawable to and away from the base to swing the table relative to the base; and f) wherein the table comprises edges forming the through opening, wherein the first direction comprises a first straight line flush with the first surface of the base, and wherein the first straight line when extended in a straight line extends to the through opening to be disposed in the through opening and spaced from the edges of the through opening.

21. A jig for supporting a strip while one end face of the strip is being cut with a powered jig saw cutting into the end face of the strip, with the powered jig saw comprising a foot having two toes and a blade reciprocating between the two toes, with the strip comprising two ends, with each of the ends of the strip comprising one end face, with the jig comprising, in combination:

a) a base, wherein the base comprises a first surface running in a first direction;

b) wherein the strip is disposed on the first surface of the base such that the strip is disposed in the first direction;

c) a table engaged to the base, wherein the table comprises a face and a through opening, with the through opening of the table being generally aligned with the first direction such that the strip is generally alignable with the through opening of the table and such that one end face of the strip is disposed adjacent to the through opening of the table when the strip is on the base whereby said end face of the strip is cut with the blade of the powered jig saw while the foot of the jig saw rides on the face of the table about the through opening of the table;

d) wherein the table is swingable about a first axis such that the table is aligned with said end face of the strip that is to be cut;

e) wherein the first axis is adjustable in height relative to the base; and f) wherein the table comprises edges forming the through opening, wherein the first direction comprises a first straight line flush with the first surface of the base, and wherein the first straight line when extended in a straight line extends to the through opening, to be disposed in the through opening and spaced from the edges of the through opening.

* * * * *